Patented Nov. 6, 1923.

1,473,331

UNITED STATES PATENT OFFICE.

HEINRICH BECHHOLD, OF FRANKFORT-ON-THE-MAIN, GERMANY.

FILTER.

No Drawing.   Application filed August 29, 1922.  Serial No. 585,087.

*To all whom it may concern:*

Be it known that I, HEINRICH BECHHOLD, a citizen of Germany, and resident of Frankfort-on-the-Main, Germany, have invented certain new and useful Improvements in or Relating to Filters, of which the following is a specification.

This invention relates to filters of diatomaceous earth, cellulose, clay or other suitable materials utilized for filtering water, fruit, juices, serum, toxins and similar liquids as well as to filtering systems, having beds or layers of sand, gravel, coke or the like utilized for filtration on a large scale. Although the filters at present in use are well adapted to retain for a certain time micro-organisms, these very soon grow through the pores of the filters with the result that in one or several days the filtered liquid becomes infected.

It is the object of the present invention to provide filters which will prevent or at any rate retard for some time infection of the filtrate, and this object is achieved by impregnating filtering masses of the kinds described with metals of lower solution tension than hydrogen or with insoluble or not easily soluble compounds of such metals.

Examples of metals and compounds which are suitable for the purpose of this invention are, copper, oxide of copper, copper ferrocyanide, copper carbonate, silver, silver oxide, silver sulphocyanate, mercury, mercuric oxide, mercurous chloride, etc. Other substances likewise suitable are for example, bismuth, bismuth trioxide and pentoxide, antimony, antimony oxide, gold, platinum, etc.

Especially good results are obtained if filters are used which have been impregnated with different metals or with not easily soluble compounds of other metals of the above mentioned group or if such filters contain in addition to one or several of such metals or metal compounds, other metals which alone are not effective or their insoluble or not readily soluble compounds. The additional substances act as activators. In place of the effective metals and metal compounds or those having only an activating effect, amalgams and alloys can be used.

There are, belonging to the first group, to be characterized as "principal ingredients," of first importance, copper, silver and mercury, as well as alloys or amalgams containing at least one of these metals, or the insoluble or not easily soluble compounds of these metals, e. g. oxide of copper, copper ferrocyanate, copper carbonate, silver chloride, silver oxide, silver sulphocyanate, mercuric oxide, mercurous chloride, etc. In this group, of lesser importance, are bismuth, antimony and arsenic, as well as the insoluble or not easily soluble compounds of these metals, e. g. the oxides of bismuth and antimony and the suphides of arsenic etc. In the group of activators are metals of lower solution tension than hydrogen, as gold, platinum, etc.

According to the present invention, the impregnation can be: Copper as principal ingredient and silver or silver chloride as activator. Copper oxide as principal ingredient and copper or silver or mercuous chloride as activator. In these examples all components belong to the group of "principal ingredients." In another example, silver or copper or silver chloride or copper oxide are principal ingredients, while an addition of gold or platinum acts as an activator.

The following experiment serves by way of example to illustrate the difference between the efficiency of a filter treated according to this invention and one untreated.

A kieselguhr filter was impregnated with silver and platinum so that the quantity of silver incorporated therein amounted to approximately 2% of the weight of the filtering mass, and the platinum to a small fraction of the silver. Water infected with *B. coli* was passed through this filter and also through a similar one untreated. Whereas the latter yielded a filtrate which although sterile at first gave positive results for *B. coli* after two days, the treated filter supplied absolutely sterile water even though it was in use for a long time. Other bacteria such as *B. typhosus, B. paratyphosus*, etc., were likewise prevented from passing or growing through the filter. Equally good results were obtained when an insoluble silver compound such as the chloride instead of silver, and gold in place of platinum or other suitable metallic compounds were used for impregnating.

When dealing with filtering masses, such as for example, layers of sand or coke used on a large scale, the individual particles of the materials forming such layers are impregnated with a metal such as copper or with several metals of the kind above mentioned, or with insoluble or not easily soluble compounds of such metals, or with mixtures of metals and compounds. Again particles treated with different metals or different insoluble metal compounds may be used.

Comparative experiments have shown that river polluted water infected with *B. coli* when filtered through layers of coke gives immediately positive results for the water bacteria and *B. coli* and even the growing through of algae was not prevented, whereas the same water passed through layers of coke, the grains of which had been impregnated in the hereinbefore described manner, was sterile and free from algae and remained in this condition for a long time.

If the filtration is to be efficient the manner in which the filtering masses are impregnated is important. Filters which have been impregnated by being soaked with a solution of silver nitrate dried and then treated for example, with a solution of caustic soda in order to precipitate the silver do not always give a satisfactory filtration because the silver salt wanders off into the outer layer of the filtering mass before the precipitation can take place. The impregnation should therefore be carried out under conditions which ensure not only a uniform distribution of the impregnating materials throughout the entire filtering mass but also a limit to the wandering of such materials, within the filtering mass. These requirements can be attained for example in the following ways:

The substances to be introduced into or incorporated with the filtering mass for instance, mercury, are added thereto from the gaseous state, or the impregnations are carried out with solutions or combinations of substances which are readily absorbed by the filters, such as for instance the metallic salts of weak acids.

Another way consists in preventing the undesired wanderings of the metals or metallic compounds by fixing the same by means of auxiliary substances which act, so to speak, physically, like mordants, or chemically or both physically and chemically. Under certain conditions the physically acting fixing substances can also serve for the subsequent chemical transformation of the incorporated substances. The auxiliary substances can be introduced into the pores of the filtering mass from the gaseous state or in a dissolved condition. The introduction of the substances to be fixed and the auxiliary fixing substances can take place successively or simultaneously.

If the requisite insoluble substances are to be produced within the filtering mass by chemical transformation and the one of physically acting auxiliary fixing means is not desired, the solutions producing the insoluble substances must have a higher molecular concentration than those previously employed.

The impregnations can be carried out at high or low pressures and temperatures, in the presence of other substances if desired, and non-aqueous dissolving means for carrying the substances can be employed. The dissolving means can be removed at high or low pressures and temperatures. The various methods of impregnation can be repeated if necessary or they can be combined with one another or with other known methods.

The metals or metallic compounds introduced into the filtering mass can be transformed by any suitable subsequent treatment such as by reduction, oxidation or the like into other compounds or elements—or they can be coated with other substances.

Examples of the methods of impregnation are as follows:

(1) A filter is first treated with a volatile fixing means for example, vaporized ammonium chloride, under conditions whereby it is precipitated uniformly in the pores thereof and then treated in the vacuum with for example, a solution of silver nitrate. This solution penetrates into all pores and the silver is precipitated and fixed as silver chloride by the ammonium chloride already introduced into the filtering mass in uniform distribution.

(2) A filter is impregnated with a physically acting auxiliary substance which does not wander on drying, for instance a solution of tannin or albumen, whereupon the filter is dried in air or in a vacuum and brought into a solution of mercuric chloride, to be dried again and to be brought after drying into a solution of caustic soda. In this manner a uniform impregnation with mercuric, or mercuric oxide is produced, which latter can be transformed into a mercury for instance by reduction.

(3) A solution of a metallic salt, for instance a solution of sulphate of copper, is admixed with a viscous substance, for instance cane-sugar or dextrine, until the mixture is sufficiently thickened.

By drying and heating a filter which is soaked uniformly with this thickened solution a uniform impregnation with copper is produced.

(4.) A filter is soaked with a fixing means of low osmotic pressure, which does not form with the metallic salt semi-permeable membranes, for instance a diluted solution of ammonium chromate, whereupon without previous drying, it is placed in a solution of nitrate of silver of higher osmotic pressure. After drying the filter is thoroughly impregnated with silver chromate.

(5.) A filter is soaked with a metallic salt solution of low osmotic pressure, for instance with a diluted solution of nitrate of silver, and brought, without drying, into a solution of higher osmotic pressure containing a fixing means or a transforming means, which does not form semi-permeable membranes with the first solution. If as second solution for instance a solution of chloride of sodium is used, a filter is obtained which is uniformly impregnated with chloride of silver.

Filters impregnated according to this invention have supplied sterile filtrates even after they have been used for months. Even saprophytic water bacteria which as is well known, grow very rapidly through filters at present in use, are prevented from passing or growing through.

Moreover the filters can be used for filtering the most varied liquids containing micro-organisms.

It is obvious however, that for each particular liquid the most suitable impregnating materials should be experimentally determined.

I claim:

1. A filter impregnated with a plurality of insoluble or not easily soluble inorganic substances, one of said substances being a metal of lower solution tension than hydrogen and of higher solution tension than platinum and another of said substances being a metal of lower solution tension than hydrogen and acting as an activator.

2. A filter impregnated with a plurality of insoluble or not easily soluble inorganic substances, one of said substances being a metal of lower solution tension than hydrogen and higher solution tension than platinum and another of said substances acting as an activator and having a lower solution tension than hydrogen and being present in relatively small proportion.

3. A filter impregnated with at least two metals of lower solution tension than hydrogen and of higher solution tension than platinum, one of said metals being in predominant quantity.

4. A filter impregnated with at least one metal of lower solution tension than hydrogen and higher solution tension than platinum and with a relatively small quantity of a metal of lower solution tension than silver.

5. A filter impregnated with the following substances: a metal having a lower solution tension than hydrogen and a higher solution tension than platinum, an activating metal having a lower solution tension than hydrogen, and an activating compound of a metal having a lower solution tension than hydrogen.

In testimony whereof I have signed my name to this specification in the presence of two subscribing witnesses.

HEINRICH BECHHOLD.

Witnesses:
 HELENE KOCH,
 T. H. ANDERSON.